US012558799B2

(12) United States Patent
Halbritter

(10) Patent No.: US 12,558,799 B2
(45) Date of Patent: Feb. 24, 2026

(54) GRIPPING APPARATUS AND ASSOCIATED SYSTEMS AND METHODS FOR GRIPPING FLEXIBLE MATERIALS

(71) Applicant: The Boeing Company, Chicago, IL (US)

(72) Inventor: Allen Halbritter, Charleston, SC (US)

(73) Assignee: The Boeing Company, Arlington, VA (US)

( * ) Notice: Subject to any disclaimer, the term of this patent is extended or adjusted under 35 U.S.C. 154(b) by 1106 days.

(21) Appl. No.: 17/644,376

(22) Filed: Dec. 15, 2021

(65) Prior Publication Data

US 2023/0182321 A1 Jun. 15, 2023

(51) Int. Cl.
| | |
|---|---|
| *B25J 15/06* | (2006.01) |
| *B29C 70/54* | (2006.01) |
| *B64F 5/50* | (2017.01) |

(52) U.S. Cl.
CPC ......... *B25J 15/0616* (2013.01); *B29C 70/546* (2013.01); *B64F 5/50* (2017.01)

(58) Field of Classification Search
CPC ............... B25J 15/0616; B25J 15/0691; B29C 2043/563
See application file for complete search history.

(56) References Cited

U.S. PATENT DOCUMENTS

| | | | | |
|---|---|---|---|---|
| 10,160,169 | B1 * | 12/2018 | Lutz | B32B 43/006 |
| 11,104,468 | B1 * | 8/2021 | Tomasetta | B25J 11/0075 |
| 11,135,805 | B2 | 10/2021 | Kozar et al. | |
| 2010/0089255 | A1 * | 4/2010 | Shimao | B30B 15/041 |
| | | | | 100/269.06 |
| 2010/0135760 | A1 * | 6/2010 | Hjornet | B25J 15/0616 |
| | | | | 348/340 |
| 2013/0127192 | A1 * | 5/2013 | Regan | B25J 15/0616 |
| | | | | 294/185 |
| 2015/0239680 | A1 * | 8/2015 | Ogle | B28B 11/16 |
| | | | | 414/800 |
| 2015/0321394 | A1 * | 11/2015 | Preisler | B29C 43/18 |
| | | | | 156/222 |
| 2016/0029437 | A1 * | 1/2016 | Grohmann | B25J 15/06 |
| | | | | 219/486 |
| 2018/0222060 | A1 * | 8/2018 | Petrovski | B29C 53/04 |
| 2018/0339413 | A1 * | 11/2018 | Halbritter | B32B 37/1018 |
| 2018/0370159 | A1 * | 12/2018 | Lutz | B29C 70/34 |
| 2019/0002132 | A1 * | 1/2019 | Halbritter | B29C 70/54 |
| 2019/0344447 | A1 | 11/2019 | Wicks et al. | |
| 2020/0070364 | A1 * | 3/2020 | Ahn | H01L 24/82 |
| 2020/0198265 | A1 * | 6/2020 | Prause | B29C 43/3642 |
| 2021/0107169 | A1 * | 4/2021 | Velasquez | B25J 15/0616 |
| 2022/0009217 | A1 * | 1/2022 | Brockschmidt | B29C 70/386 |

OTHER PUBLICATIONS

European Patent Office, Extended European Search Report, App. No. 22200376.6 (May 22, 2023).

* cited by examiner

*Primary Examiner* — Andrew D Graham
(74) *Attorney, Agent, or Firm* — Walters & Wasylyna LLC

(57) ABSTRACT

A gripping apparatus includes an impermeable layer defining a vacuum port, a first flow media layer associated with the impermeable layer, and a second flow media layer opposed from the first flow media layer to define a receiving space therebetween.

20 Claims, 5 Drawing Sheets

*200*

PLACING ~*210*

DRAWING ~*220*

CONTROLLING ~*225*

PLACING ~*230*

DRAWING ~*240*

CONTROLLING ~*245*

TENSIONING ~*250*

*255*~ ENGAGING

MOVING ~*260*

GRIPPING APPARATUS AND ASSOCIATED SYSTEMS AND METHODS FOR GRIPPING FLEXIBLE MATERIALS

FIELD

The present disclosure generally relates to the transportation of flexible materials and, more particularly, to gripping apparatus and associated methods and systems for gripping flexible materials, such as a composite plies.

BACKGROUND

Manufacturing of large composite parts, particularly in the aerospace industry, requires movement of flexible material, such as uncured or partially cured composite materials (e.g., prepreg plies). Uniformly gripping flexible materials for moving between manufacturing stations without distorting the flexible material can be difficult. Typical methods for moving such flexible materials include holding the flexible material in discrete locations at a constant grip force. Drawbacks include causing a non-uniform pressure or tension across the part surface. Non-uniform tension and/or pressure may result in damage to the flexible materials.

Accordingly, those skilled in the art continue research and development in the field of transporting flexible materials.

SUMMARY

The following is a non-exhaustive list of examples, which may or may not be claimed, of the subject matter according to the present disclosure Disclosed are gripping apparatus.

In one example, the disclosed gripping apparatus includes an impermeable layer defining a vacuum port, a first flow media layer associated with the impermeable layer, and a second flow media layer opposed from the first flow media layer to define a receiving space therebetween.

Also disclosed are systems for gripping a flexible material

In one example, the disclosed system for gripping a flexible material includes a gripping apparatus. The gripping apparatus has an impermeable layer, a first flow media layer associated with the impermeable layer of the gripping apparatus, and a second flow media layer opposed from the first flow media layer of the gripping apparatus to define a first receiving space therebetween. The system further includes a second gripping apparatus. The second gripping apparatus has an impermeable layer, a first flow media layer associated with the impermeable layer of the second gripping apparatus, and a second flow media layer opposed from the first flow media layer of the second gripping apparatus to define a second receiving space therebetween. The system further includes a vacuum source in fluid communication with the gripping apparatus and the second gripping apparatus.

Also disclosed are methods for gripping a flexible material, the flexible material comprising a first portion and second portion.

In an example, the disclosed method for gripping a flexible material includes placing a gripping apparatus into contact with the first portion of the flexible material, the gripping apparatus comprising an impermeable layer and a flow media layer. The method further includes drawing a vacuum between the gripping apparatus and the first portion of the flexible material to engage the first portion of the flexible material with the gripping apparatus. The method further includes placing a second gripping apparatus into contact with the second portion of the flexible material, the second gripping apparatus comprising an impermeable layer and a flow media layer. The method further includes drawing a vacuum between the second gripping apparatus and the second portion of the flexible material to engage the second portion of the flexible material with the second gripping apparatus.

DETAILED DESCRIPTION

Figure 1:
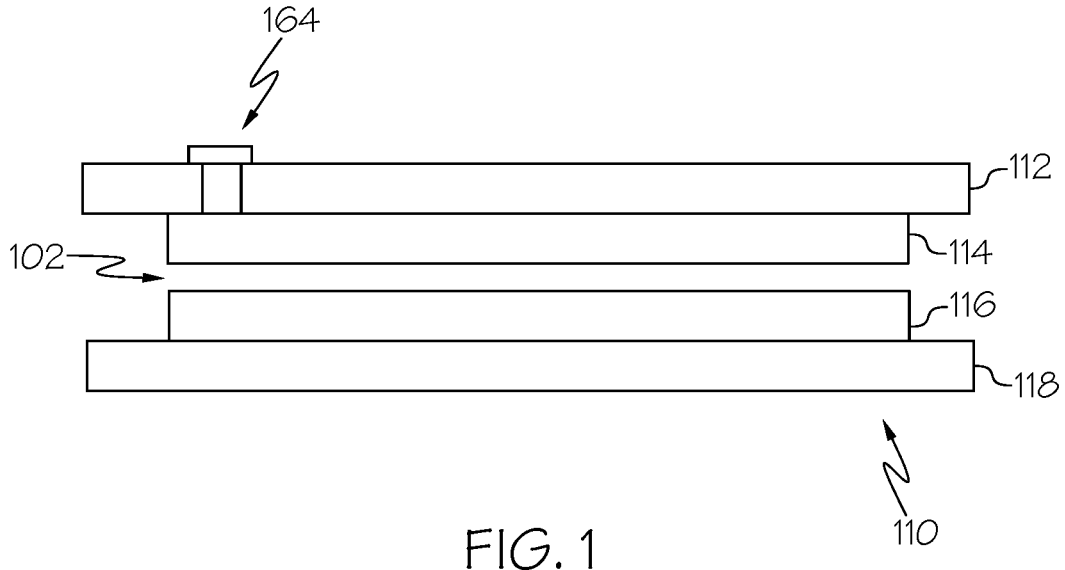
FIG. 1 is a cross-sectional schematic view of a gripping apparatus.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

In one or more examples, the gripping apparatus 110 (FIG. 1), system 150 (FIG. 2), and method 200 (FIG. 3) may be used to facilitate manufacturing of composite parts, i.e., workpieces. In one example, composite parts, such as carbon fiber reinforcement polymer parts, are initially laid-up in multiple layers that together are referred to as a laminate or "prepreg." Individual fibers within each layer of the laminate are aligned parallel with each other, but different layers may exhibit different fiber orientations in order to increase the strength of the resulting composite part along different dimensions. The laminate may include a viscous resin that solidifies in order to harden the laminate into a composite part (e.g., for use in an aircraft). In an example, the gripping apparatus 110, system 150, method 200 may be used to facilitate manufacturing of composite parts comprised of thermoplastic resins.

Referring to FIG. 1, disclosed is a gripping apparatus 110. The gripping apparatus 110 includes an impermeable layer 112. The impermeable layer 112 defines a vacuum port 164. In one example, the impermeable layer 112 includes a polymeric material. In another example, the impermeable layer 112 includes rubber. In one non-limiting example, the impermeable layer 112 is Mosites™ rubber.

Still referring to FIG. 1, the gripping apparatus 110 includes a first flow media layer 114 associated with the impermeable layer. In one example, the first flow media layer 114 includes a biplanar mesh. In another example, the first flow media layer 114 is in the form of a sheet, such as a sheet of biplanar mesh.

The gripping apparatus 110 further includes a second flow media layer 116 opposed from the first flow media layer 114 to define a receiving space 102 therebetween. The receiving space 102 may be generally shaped and sized to receive a flexible material 130. In one example, the first flow media layer 114 is adjacent to the impermeable layer 112. In another example, the first flow media layer 114 is connected to the impermeable layer 112.

In one or more examples, the gripping apparatus 110 further includes a second impermeable layer 118 associated with the second flow media layer 116. The first flow media layer 114 and the second flow media layer 116 are positioned between the impermeable layer 112 and the second impermeable layer 118. In one example, the second flow media layer 116 is adjacent to the second impermeable layer 118. The second impermeable layer 118 may include a polymeric material. In another example, the second impermeable layer 118 may include rubber. In yet another example, the second impermeable layer 118 includes a metal.

In one or more examples, the impermeable layer 112 is comprised of a first material and the second impermeable layer 118 is comprised of a second material. The first material and the second material may be compositionally substantially the same. Alternatively, the first material and the second material may be compositionally different.

Figure 2:
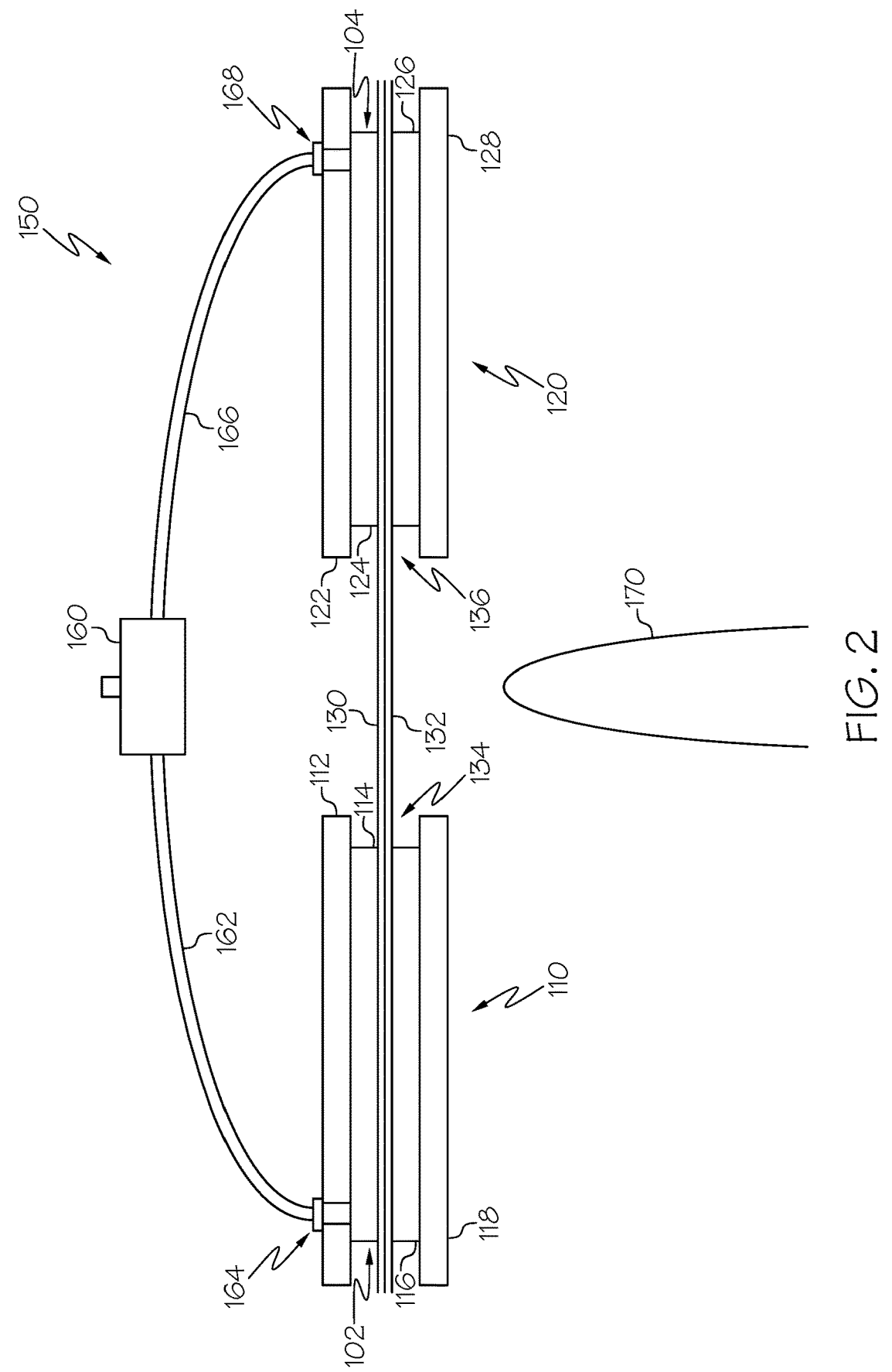
FIG. 2 is a cross-sectional schematic view of a system for gripping a flexible material.

Referring to FIG. 2, disclosed is a system 150 for gripping a flexible material 130. The system 150 includes a gripping apparatus 110. The gripping apparatus 110 includes an impermeable layer 112. In one or more examples, the impermeable layer 112 of the gripping apparatus 110 comprises a polymeric material. In another example, the impermeable layer 112 of the gripping apparatus 110 comprises rubber.

Still referring to FIG. 2, the gripping apparatus 110 of the system 150 includes a first flow media layer 114 associated with the impermeable layer 112 of the gripping apparatus 110. In one example, the first flow media layer 114 of the gripping apparatus 110 is connected to the impermeable layer 112. The first flow media layer 114 of the gripping apparatus 110 may include a biplanar mesh.

Still referring to FIG. 2, the gripping apparatus 110 of the system 150 includes a second flow media layer 116 opposed from the first flow media layer 114 of the gripping apparatus 110 to define a receiving space 102 therebetween. In one example, the second flow media layer 116 of the gripping apparatus 110 includes a biplanar mesh.

The gripping apparatus 110 of the system 150 may further include a second impermeable layer 118 associated with the second flow media layer 116 of the gripping apparatus 110. The first flow media layer 114 of the gripping apparatus 110 and the second flow media layer 116 of the gripping apparatus 110 may be between the impermeable layer 112 of the gripping apparatus 110 and the second impermeable layer 118 of the gripping apparatus 110.

Referring to FIG. 2, the system 150 includes a second gripping apparatus 120. The second gripping apparatus 120 includes an impermeable layer 122 and a first flow media layer 124 associated with the impermeable layer 122 of the second gripping apparatus 120.

The second gripping apparatus 120 of the system 150 further includes a second flow media layer 126 opposed from the first flow media layer 124 of the second gripping apparatus 120 to define a second receiving space 104 therebetween. The second flow media layer 126 of the second gripping apparatus 120 may include a biplanar mesh.

In one or more examples, the second gripping apparatus 120 may further include a second impermeable layer 128 associated with the second flow media layer 126 of the second gripping apparatus 120. The first flow media layer 124 of the second gripping apparatus 120 and the second flow media layer 126 of the second gripping apparatus 120 may be between the impermeable layer 122 of the second gripping apparatus 120 and the second impermeable layer 128 of the second gripping apparatus 120.

Still referring to FIG. 2, the system 150 further includes a vacuum source 160 in fluid communication with the gripping apparatus 110 and the second gripping apparatus 120. The system 150 may further include a first vacuum tube 162 fluidly coupling the vacuum source 160 with a vacuum port 164 of the gripping apparatus 110. Further, the system 150 may include a second vacuum tube 166 fluidly coupling the vacuum source 160 with a second vacuum port 168 of the second gripping apparatus 120.

In one or more examples, the flexible material 130 includes a composite ply. In another example, the flexible material 130 includes a plurality of composite plies. In one example, the system 150 further includes a release film 132 coupled to the flexible material 130.

Still referring to FIG. 2, the system 150 may further include a tool 170 for engaging the flexible material 130. The tool 170 may be a mandrel. In one example, the tool 170 is in the shape of an aerospace component. The tool 170 may have prior a prior layer of the flexible material 130 on it, such as a ply of composite material.

Figure 3:
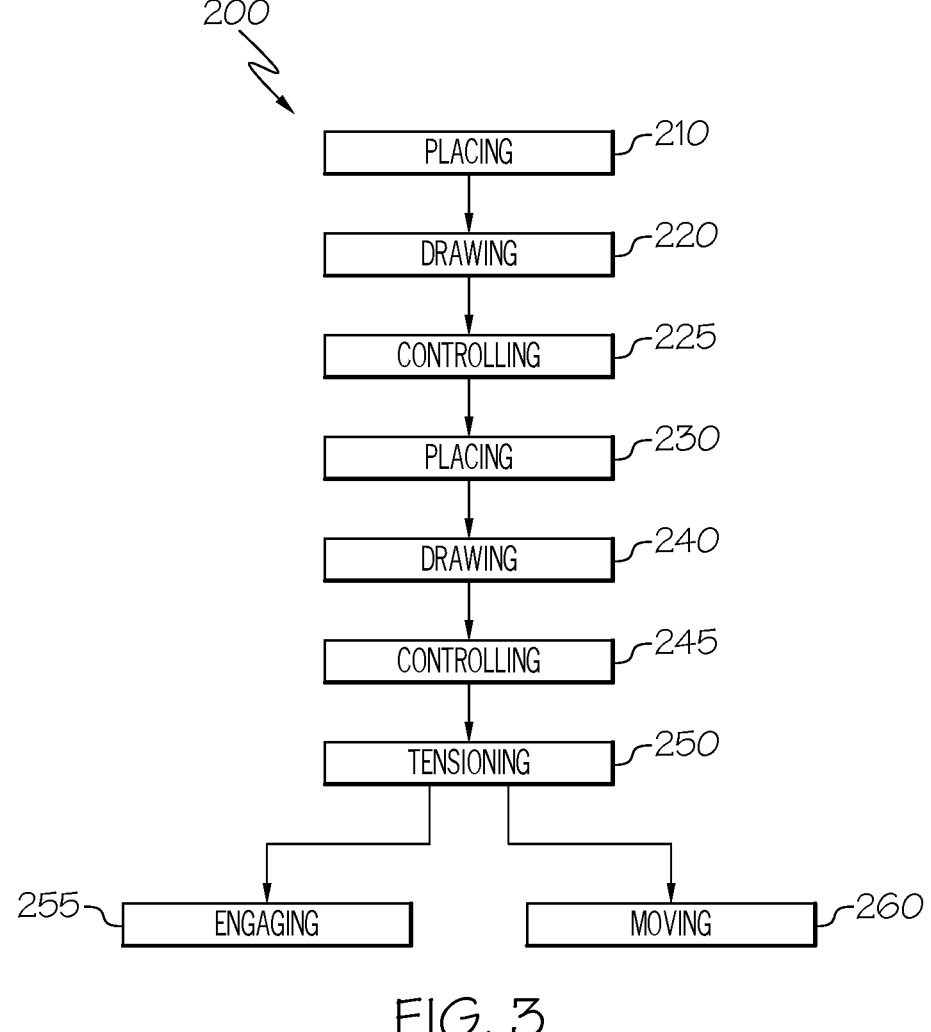
FIG. 3 is a flow chart of a method for gripping a flexible material.

Referring to FIG. 3, disclosed is a method 200 for gripping a flexible material 130. The flexible material 130 has a first portion 134 and second portion 136. In one example, the flexible material 130 comprises a composite ply. In another example, the flexible material 130 includes a plurality of composite plies. In yet another example, the flexible material 130 is coupled to a release film 132.

Still referring to FIG. 3, the method includes placing 210 a gripping apparatus 110 into contact with the first portion 134 of the flexible material 130. The gripping apparatus 110 includes an impermeable layer 112 and a flow media layer 114. The impermeable layer 112 defines a vacuum port 164. In one example, the impermeable layer 112 includes a polymeric material. In another example, the impermeable layer 112 includes rubber.

In one example, the gripping apparatus 110 includes a first flow media layer 114 associated with the impermeable layer. In one example, the first flow media layer 114 includes a biplanar mesh. In another example, the first flow media layer 114 is in the form of a sheet, such as a sheet of biplanar mesh.

The gripping apparatus 110 further includes a second flow media layer 116 opposed from the first flow media layer 114 to define a receiving space 102 therebetween. The receiving space 102 may be generally shaped and sized to receive a flexible material 130. In one example, the first flow media layer 114 is adjacent to the impermeable layer 112. In another example, the first flow media layer 114 is connected to the impermeable layer 112.

In one or more examples, the gripping apparatus 110 further includes a second impermeable layer 118 associated with the second flow media layer 116. The first flow media layer 114 and the second flow media layer 116 are positioned between the impermeable layer 112 and the second impermeable layer 118. In one example, the second flow media layer 116 is adjacent to the second impermeable layer 118. The second impermeable layer 118 may include a polymeric material. In another example, the second impermeable layer 118 may include rubber. In yet another example, the second impermeable layer 118 includes a metal.

In one or more examples, the gripping apparatus 110 impermeable layer 112 is comprised of a first material and the gripping apparatus 110 second impermeable layer 118 is comprised of a second material. The first material and the second material may be compositionally substantially the same. Alternatively, the first material and the second material may be compositionally different.

Still referring to FIG. 3, the method includes drawing 220 a vacuum between the gripping apparatus 110 and the first portion 134 of the flexible material 130 to engage the first portion 134 of the flexible material 130 with the gripping apparatus 110. In one example, the drawing 220 includes evacuation of air from the gripping apparatus 110 first flow media layer 114 and the gripping apparatus 110 second flow media layer 116. The drawing 220 locks the gripping apparatus 110 by evacuation of air, thus increasing friction among the layers of the gripping apparatus 110 and selectively controlling shear slippage.

The amount of vacuum drawn may vary based upon the material properties of the flexible material 130. The drawing 220 results in a gripping force applied to the flexible material 130. The gripping force applied to the flexible material 130 is dependent on the amount of vacuum drawn. For example, the amount of vacuum drawn may be a function of the flexible material 130 shear slippage properties to permit the desired amount of shear slippage between the flexible material 130 and the gripping apparatus 110.

Still referring to FIG. 3, the method includes placing 230 a second gripping apparatus 120 into contact with the second portion 136 of the flexible material 130, the second gripping apparatus 120 comprising a second gripping apparatus 120 impermeable layer 122 and a second gripping apparatus 120 first flow media layer 124.

The second gripping apparatus 120 impermeable layer 122 defines a second vacuum port 168. In one example, the second gripping apparatus 120 impermeable layer 122 includes a polymeric material. In another example, the second gripping apparatus 120 impermeable layer 122 includes rubber. In one non-limiting example, the second gripping apparatus 120 impermeable layer includes Mosites™ rubber.

Referring to FIG. 2, the second gripping apparatus 120 includes a second gripping apparatus 120 first flow media layer 124 associated with the impermeable layer. In one example, the second gripping apparatus 120 first flow media layer 124 includes a biplanar mesh. In another example, the second gripping apparatus 120 first flow media layer 124 is in the form of a sheet, such as a sheet of biplanar mesh.

The second gripping apparatus 120 further includes a second gripping apparatus 120 second flow media layer 126 opposed from the second gripping apparatus 120 first flow media layer 124 to define a receiving space 102 therebetween. The receiving space 102 may be generally shaped and sized to receive a flexible material 130. In one example, the second gripping apparatus 120 first flow media layer 124 is adjacent to the second gripping apparatus 120 impermeable layer 122. In another example, the second gripping apparatus 120 first flow media layer 124 is connected to the second gripping apparatus 120 impermeable layer 122.

In one or more examples, the second gripping apparatus 120 further includes a second impermeable layer 128 associated with the second gripping apparatus 120 second flow media layer 126. The second gripping apparatus 120 first flow media layer 124 and the second gripping apparatus 120 second flow media layer 126 are positioned between the second gripping apparatus 120 impermeable layer 122 and the second gripping apparatus 120 second impermeable layer 128. In one example, the second gripping apparatus 120 second flow media layer 126 is adjacent to the second gripping apparatus 120 second impermeable layer 128. The second gripping apparatus 120 second impermeable layer 128 may include a polymeric material. In another example, the second gripping apparatus 120 second impermeable layer 128 may include rubber. In yet another example, the second gripping apparatus 120 second impermeable layer 128 includes a metal.

In one or more examples, the second gripping apparatus 120 impermeable layer 122 is comprised of a first material and the second gripping apparatus 120 second impermeable layer 128 is comprised of a second material. The first material and the second material may be compositionally substantially the same. Alternatively, the first material and the second material may be compositionally different.

Still referring to FIG. 3, the method includes drawing 240 a vacuum between the second gripping apparatus 120 and the second portion 136 of the flexible material 130 to engage the second portion 136 of the flexible material 130 with the second gripping apparatus 120. In one example, the drawing 240 includes evacuation of air from the second gripping apparatus 120 first flow media layer 124 and the second gripping apparatus 120 second flow media layer 126. The drawing 240 locks the second gripping apparatus 120 by evacuation of air, thus increasing friction among the layers of the second gripping apparatus 120 and selectively controlling shear slippage.

The amount of vacuum drawn may vary based upon the material properties of the flexible material 130. The drawing 240 results in a gripping force applied to the flexible material 130. The gripping force applied to the flexible material 130 is dependent on the amount of vacuum drawn. For example, the amount of vacuum drawn may be a function of the flexible material 130 shear slippage properties to permit the desired amount of shear slippage between the flexible material 130 and the second gripping apparatus 120.

In one or more examples, the drawing 220 the vacuum between the gripping apparatus 110 and the first portion 134 of the flexible material 130 comprises controlling 225 a vacuum flow rate to maintain engagement between the first portion 134 of the flexible material 130 and the gripping apparatus 110, while permitting shear slippage of the first portion 134 of the flexible material 130 relative to the gripping apparatus 110. For example, the gripping force between the gripping apparatus 110 and the flexible material 130 may be a function of the amount of vacuum drawn.

In one or more examples, the drawing 240 the vacuum between the second gripping apparatus 120 and the second portion 136 of the flexible material 130 comprises controlling 245 a vacuum flow rate to maintain engagement between the second portion 136 of the flexible material 130 and the second gripping apparatus 120, while permitting shear slippage of the second portion 136 of the flexible material 130 relative to the second gripping apparatus 120. For example, the gripping force between the second gripping apparatus 120 and the flexible material 130 may be a function of the amount of vacuum drawn.

Still referring to FIG. 3, the method 200 further includes tensioning 250 the flexible material 130 while the first portion 134 of the flexible material 130 is engaged with the gripping apparatus 110 and the second portion 136 of the flexible material 130 is engaged with the second gripping apparatus 120. In one example, the tensioning 250 comprises engaging 255 the flexible material 130 with a tool 170. The engaging 255 may include draping the flexible material 130 over the tool 170. In another example, the tensioning 250 comprises moving 260 the gripping apparatus 110 relative to the second gripping apparatus 120. In one example, the moving 260 includes moving 260 the gripping apparatus 110 away from the second gripping apparatus 120.

Figure 4:
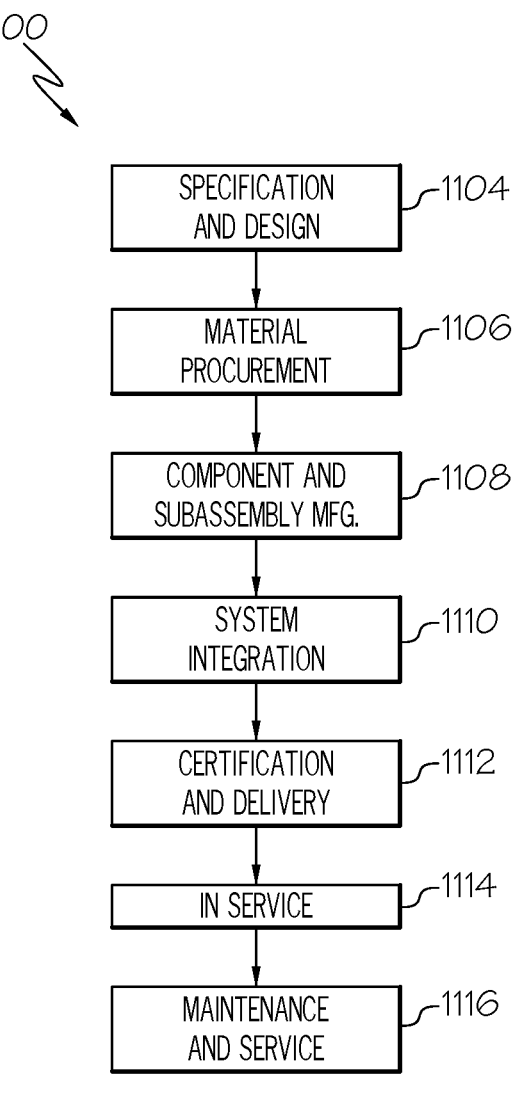
FIG. 4 is a flow chart is a block diagram of aircraft production and service methodology.
Figure 5:
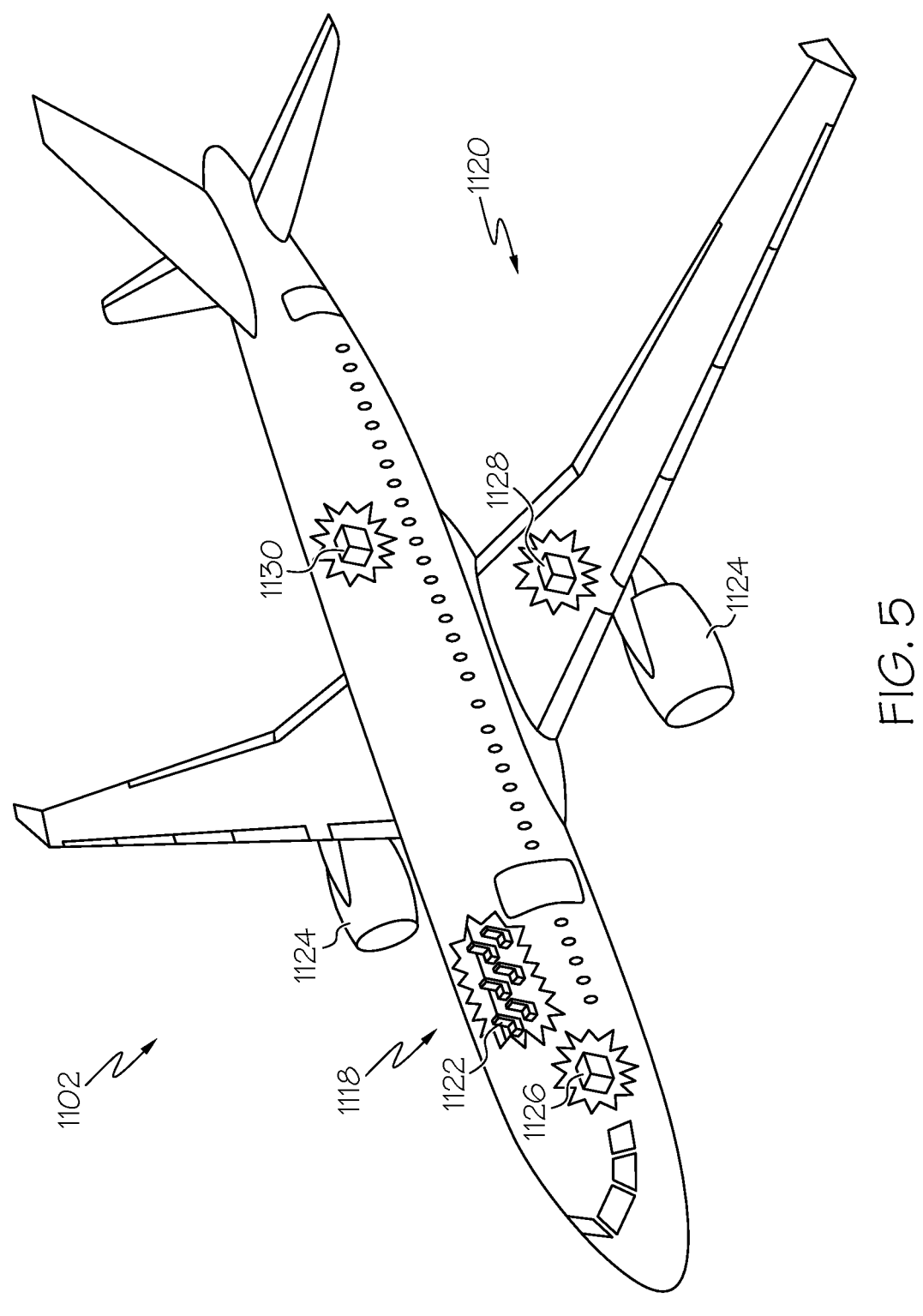
FIG. 5 is a schematic of the aircraft.

Examples of the present disclosure may be described in the context of aircraft manufacturing and service method 1100 as shown in FIG. 4 and aircraft 1102 as shown in FIG. 5. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 5, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Structure(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the structure (s), method(s), or combination thereof may be utilized during production stages production, component and subassembly manufacturing (Block 1108) and system integration (1110), for example, by substantially expediting assembly of or reducing the cost of aircraft 1102. Similarly, one or more examples of the structure or method realizations, or a combination thereof, may be utilized, for example and without limitation, while aircraft 1102 is in service (Block 1114) and/or during maintenance and service (Block 1116).

Different examples of the structure(s) and method(s) disclosed herein include a variety of components, features, and functionalities. It should be understood that the various examples of the structure(s) and method(s) disclosed herein may include any of the components, features, and functionalities of any of the other examples of the structure(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A gripping apparatus comprising:
   a first impermeable layer defining a vacuum port;
   a first flow media layer disposed directly adjacent to the first impermeable layer;
   a second impermeable layer opposed from the first impermeable layer; and
   a second flow media layer disposed directly adjacent to the second impermeable layer and opposed from the first flow media layer,
   wherein the first flow media layer and the second flow media layer are spaced apart to define a receiving space therebetween, the receiving space being open at one or more lateral ends to permit insertion of a material between the first flow media layer and the second flow media layer.

2. The gripping apparatus of claim 1, wherein the first flow media layer is in contact with the first impermeable layer.

3. The gripping apparatus of claim 1, wherein the first impermeable layer comprises a polymeric material.

4. The gripping apparatus of claim 1, wherein the first impermeable layer comprises rubber.

5. The gripping apparatus of claim 1, wherein the first flow media layer comprises a biplanar mesh.

6. The gripping apparatus of claim 1, wherein the second flow media layer is in contact with adjacent to the second impermeable layer.

7. The gripping apparatus of claim 1, wherein the second impermeable layer comprises a polymeric material.

8. The gripping apparatus of claim 1, wherein the first impermeable layer is comprised of a first material, wherein the second impermeable layer is comprised of a second material, and wherein the first material and the second material are compositionally substantially the same.

9. A system for gripping a flexible material, the system comprising:
   a first gripping apparatus comprising:

9 a first impermeable layer;

a first flow media layer disposed directly adjacent to the first impermeable layer of the first gripping apparatus;

a second impermeable layer opposed from the first impermeable layer; and a second flow media layer disposed directly adjacent to the second impermeable layer and opposed from the first flow media layer of the first gripping apparatus, wherein the first flow media layer and the second flow media layer are spaced apart to define a first receiving space therebetween, the first receiving space being open at one or more lateral ends to permit insertion of a material between the first flow media layer and the second flow media layer;

a second gripping apparatus comprising:

a third impermeable layer;

a third flow media layer disposed directly adjacent to the third impermeable layer of the second gripping apparatus;

a fourth impermeable layer opposed from the third impermeable layer; and a fourth flow media layer disposed directly adjacent to the fourth impermeable layer and opposed from the third flow media layer of the second gripping apparatus, wherein the third flow media layer and the fourth flow media layer are spaced apart to define a second receiving space therebetween, the second receiving space being open at one or more lateral ends to permit insertion of the material between the third flow media layer and the fourth flow media layer; and a vacuum source in fluid communication with the first gripping apparatus and the second gripping apparatus.

10. The system of claim 9, wherein the flexible material comprises a composite ply.

11. The system of claim 9, wherein the first flow media layer of the first gripping apparatus comprises a biplanar mesh.

12. The system of claim 11, wherein the second flow media layer of the first gripping apparatus comprises a biplanar mesh.

13. The system of claim 9, further comprising a release film coupled to the flexible material.

14. The system of claim 9, further comprising a first vacuum tube fluidly coupling the vacuum source with a vacuum port of the first gripping apparatus.

15. The system of claim 9, further comprising a second vacuum tube fluidly coupling the vacuum source with a second vacuum port of the second gripping apparatus.

16. The system of claim 9, further comprising a tool for engaging the flexible material.

17. The gripping apparatus of claim 1, wherein the vacuum port is positioned to communicate directly with the first flow media layer to distribute vacuum across the receiving space.

18. The system of claim 9, wherein the first gripping apparatus and the second gripping apparatus are positioned to engage opposed portions of the flexible material to apply tension to the flexible material.

19. A method for gripping a flexible material using the gripping apparatus of claim 1, the method comprising:

positioning the flexible material within the receiving space defined between the first flow media layer and the second flow media layer; and applying a vacuum through the vacuum port of the first impermeable layer to evacuate the receiving space and thereby draw the flexible material against the first flow media layer and the second flow media layer.

20. A method for gripping the flexible material using the system of claim 9, the method comprising:

positioning a first portion of the flexible material within the first receiving space of the first gripping apparatus and a second portion of the flexible material within the second receiving space of the second gripping apparatus; and applying a vacuum from the vacuum source to both the first gripping apparatus and the second gripping apparatus to engage the first portion and the second portion of the flexible material.

* * * * *